HORIZONTAL DEFLECTION CIRCUIT

Filed Nov. 1, 1966

INVENTORS.
WILLIAM GELLER
KURT HILLMAN
BY R. J. Frank
ATTORNEY.

INVENTORS.
WILLIAM GELLER
KURT HILLMAN
BY R. J. Frank
ATTORNEY.

United States Patent Office 3,423,631

Patented Jan. 21, 1969

3,423,631
HORIZONTAL DEFLECTION CIRCUIT
William Geller, Plainview, and Kurt Hillman, Flushing, N.Y., assignors to General Telephone & Electronics Laboratories Incorporated, a corporation of Delaware Filed Nov. 1, 1966, Ser. No. 591,161
U.S. Cl. 315—27 1 Claim
Int. Cl. H01j 29/70

ABSTRACT OF THE DISCLOSURE

A solid state horizontal deflection circuit for a television receiver which employs a gate controlled switch and a silicon controlled rectifier is described.

This invention relates to horizontal deflection circuits for cathode ray tube scanning and, in particular, to a solid-state horizontal deflection circuit.

The horizontal scan signal in a television receiver provides the horizontal deflection field for the electron beam in the cathode ray tube. The scan signal is characterized by a substantially sawtooth current waveform and as standardized in the United States at the 15.75 kilocycle rate is substantially greater than that of the vertical sawtooth signal and for equal energy dissipation per cycle in the respective deflection circuits, over 200 times as much energy must be supplied to the horizontal deflection coils as is supplied to the vertical deflection coils. Thus, power economy or efficiency is of primary importance in the horizontal deflection circuit.

The high frequency and high power requirements of the horizontal deflection circuit have heretofore favored the continued use of vacuum tube circuitry in commercial television receivers. The recent development of high power solid state components, for example silicon controlled rectifiers, gate controlled switches, high power transistors and the like, have generated interest in solid state deflection circuits.

While solid state components are capable of switching the required reactive power for the horizontal deflection circuit of a color television receiver, their performance characteristics have resulted in less efficient operation than that of vacuum tube deflection circuits. For example, gate controlled switches may be rendered conductive, i.e., turned-on, by supplying a positive drive current to the gate electrode and rendered nonconductive, i.e., turned-off, by supplying a negative drive current to the gate electrode. However, gate controlled switches having the required volt-ampere ratings, typically greater than 1500, require a very high turn-off drive current. The ratio of the turn-off drive current to the current flowing through the switch is referred to as the turn-off gain and is found to decrease for increasing volt-ampere power. In practice, a horizontal deflection circuit using gate controlled switches must be capable of efficient and reliable operation with switch turn-off gains as low as two. Due to the low turn-off gain, it is necessary to provide a high turn-off drive current to remove stored carriers in the switch and effect turn-off. The high turn-off drive required for low turn-off gain device often results in Zener breakdown of the gate junction. This is a condition of high power dissipation in the device and is normally characterized by the flow of a high reverse current from the gate thereof. In order to obtain efficient and reliable circuit operation it is necessary to minimize the flow and duration of reverse current during breakdown.

Accordingly, an object of the present invention is to provide an improved solid state horizontal deflection circuit.

Another object is to provide a horizontal deflection circuit having improved efficiency.

A further object is to provide a solid state horizontal deflection circuit in which the time required for the removal of stored carriers is minimized and the duration of reverse currents is minimized.

In accordance with the present invention, a circuit is provided for generating a sawtooth signal in accordance with a frequency stable gating signal which includes a first semiconductor switching device having first, second and third electrodes. The first switching device controls the reactive power needed for a horizontal deflection coil. The device passes current from its first to third electrodes when a first polarity signal is applied to the second electrode and is rendered nonconductive, i.e., turned off, by the application of a second polarity signal to the second electrode.

At least one semiconductor junction in the device is electrically located between the second and third electrodes the first to third electrodes. Before the device can be turned off, these carriers must be swept out of the junction. To provide a rapid turn off of less than one microsecond, a second semiconductor switching device having first, second and third electrodes is provided. The first electrode of the second device is coupled to the second electrode of the first device and the third electrode of the second device is coupled to a turn-off voltage source having a second polarity.

The second device passes current flowing from its first to third electrode when a gating signal is applied to its second electrode. When the second device is rendered conductive, current flows from the second electrode of the first device through the second device to the turn-off voltage source. This current sweeps the stored carriers from the first device and renders it nonconductive. The turn-off is provided in less than one microsecond. The voltage at the second electrode of the first device, which can be considered to be the turn-off voltage, assuming negligible voltage drop across the second device, primarily determines the time required for turn off and is chosen to be relatively high. In general, a turn-off voltage of −15 volts exceeds the breakdown voltage of the first device. If breakdown occurs, the first device may pass relatively large reverse currents through the second device to the voltage source.

To eliminate the problem of high reverse current flow, the third electrode of the first device is coupled to the first electrode of a unidirectional current means, for example a diode, rather than directly to a reference potential or ground. The unidirectional means is poled to pass current flowing from its first to second electrodes and its second electrode is coupled to ground. As a result, when the stored carriers are removed from the first device essentially no current flows through the second device. The peak turn-off current is determined by the turn-off voltage and the resistance appearing at the second electrode of the first device and is typically of the order of several amperes.

This combination of the first and second switching devices and the unidirectional current means enables the turn-off of the first device to be accomplished in 0.1 microsecond in a circuit employing commercially available solid state devices. The turn-off voltage is permitted to exceed the breakdown voltage of the first device due to the reverse current limiting effect of the unidirectional means. In addition, the use of a silicon controlled rectifier as the second device results in this device being turned off when the stored charge is removed without applying a signal to its second electrode.

The first device is rendered conductive by a first polarity signal applied to its second electrode. This signal is normally a low power signal and may be supplied by coupling a semiconductor switch capable of supplying about 200 milliameres to the second electrode. By deriving turn-on and turn-off signals from separate circuits, the efficiency of the deflection circuit can be improved since the power level of the turn-on signal is typically a fraction of that of the turn-off signal.

To complete the circuit, the first electrode of the first device is coupled to the parallel combination of a resonant circuit and a damper diode. The resonant circuit contains the horizontal deflection coil and a flyback capacitor. The gating signals may be supplied from the transformer winding of a frequency stable generator having a pulse output. One such frequency determining circuit is described in detail in U.S. Patent 3,156,876 issued Nov. 16, 1964 to M. Fischman et al., and assigned to the same assignee as the present application.

Further features and advantages of the invention will become more readily apparent from the following detailed description of a specific embodiment when taken in conjunction with the accompanying drawings in which.

Figure 1:
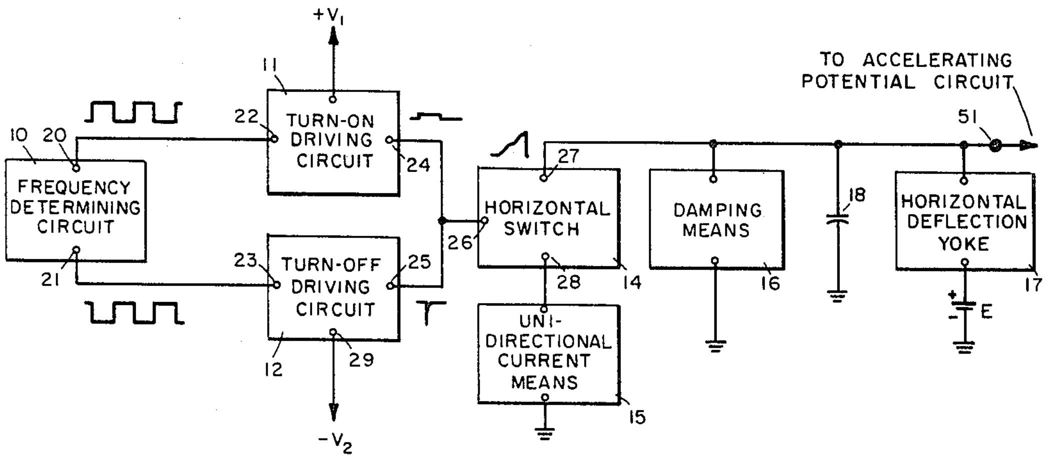
FIG. 1 is a block schematic diagram of a horizontal deflection circuit in accordance with the invention.

Referring now to FIG. 1, a horizontal deflection circuit for cathode ray tube scanning is shown comprising a frequency determining circuit 10 having a frequency stable pulse output. As shown, circuit 10 provides two pulse output signals of equal frequency having a 180 degree phase difference therebetween at terminals 20 and 21 respectively. The output signal frequency of the circuit 10 is standardized in the United States at 15,750 c.p.s. although the invention is not limited thereto.

Terminal 20 is coupled to terminal 22 of turn-on driving circuit 11. Output terminal 24 of circuit 11 is coupled to terminal 26 of horizontal switch 14. The circuit 11, in response to the positive portion of the pulses applied at terminal 22, provides turn-on current pulses to switch 26 having the general shape shown. Typical current pulses are 100 milliamperes in amplitude with a fixed duration of 32.5 microseconds. Circuit 24 preferably contains a high current gain transistor switch, such as type 2N2218, so that the loading on the frequency determining circuit is minimized.

The current output of circuit 11 renders horizontal switch 14 conductive so that a low impedance path is provided for current flowing from terminals 27 to 28. Terminal 28 is coupled to one electrode of unidirectional current means 15. The other electrode of means 15 is coupled to ground. Current means 15 is poled to pass current flowing from the terminal 28 to ground.

When the positive current from driving circuit 11 is applied to terminal 26 of switch 14, a step of voltage $+E$ is applied to the horizontal deflection yoke 17 which results in a linear increase in current through switch 14. As shown, the current has a sawtooth waveform until the scan is completed. At this time, the pulse output at terminal 21 of circuit 10 becomes positive. This terminal is coupled to terminal 23 of turn-off driving circuit 12. Driving circuit 12 is rendered conductive by the positive signal applied to terminal 23 substantially at the same time that turn-on driving circuit 11 is being rendered nonconductive. When the driving circuit 12 becomes conductive, a current signal appears at terminal 25 having the approximate waveform shown. One method of providing this current signal utilizes a silicon controlled rectifier for the active element of circuit 12 with terminals 23, 25 and 29 corresponding to the gate, anode and cathode electrodes respectively. The positive signal at terminal 23 establishes a low resistance path between terminal 26 of switch 14 and voltage source $-V_2$.

Horizontal switch 14 is conducting during the period that a positive current signal is supplied to terminal 26. The current flowing from horizontal deflection yoke 17 through horizontal switch 14 and unidirectional current means 15 to ground increases substantially linearly to a peak value of about 4 amperes. During this time, the semiconductor device of switch 14 is conducting heavily and a relatively high reverse drive, of the order of several amperes, is required to remove the stored carriers and effect turn-off. In practice, the high reverse current is necessary to turn off either a gate controlled switch or a high power transistor when employed as the active element of switch 14.

To provide a relatively fast turn-off response of about 0.1 microsecond, the turn-off voltage source $-V_2$ is chosen to be of the order of $-30$ volts which exceeds the typical reverse breakdown voltage of semiconductor junctions. If the junction between terminals 26 and 28 of switch 14 is permitted to break down, the switch is capable of passing large reverse currents. However, unidirectional current means 15 is polled to pass current flowing from terminal 28 to ground and therefore inhibits the flow of any reverse current through the switch 14.

Since the reverse current is prevented from flowing, the current waveform at terminal 25 of turn-off driving circuit 12 returns to zero after the stored carriers have been swept out of switch 14. As a result, driving circuit 12 requires a low turn-off drive power to render switch 14 rapidly nonconductive. In addition by employing a silicon controlled rectifier as the active element of circuit 12, unidirectional current means 15 serves not only to prevent the flow of reverse current through switch 14 but also renders the silicon controlled rectifier nonconductive when the carriers have been swept out.

The ability to provide a large turn-off drive so that the peak of the negative current waveform at terminal 26 of switch 14 can be approximately equal to the peak current at terminal 27 enables the horizontal switch to vary from peak conduction to nonconduction in a fraction of a microsecond. Thus, horizontal switch 14 is driven nonconductive before any substantial voltage increase occurs at terminal 27 due to the resonant circuit comprising yoke 17 and flyback capacitor 18 and the turn-off power loss of switch 14 is minimized.

Figure 2:
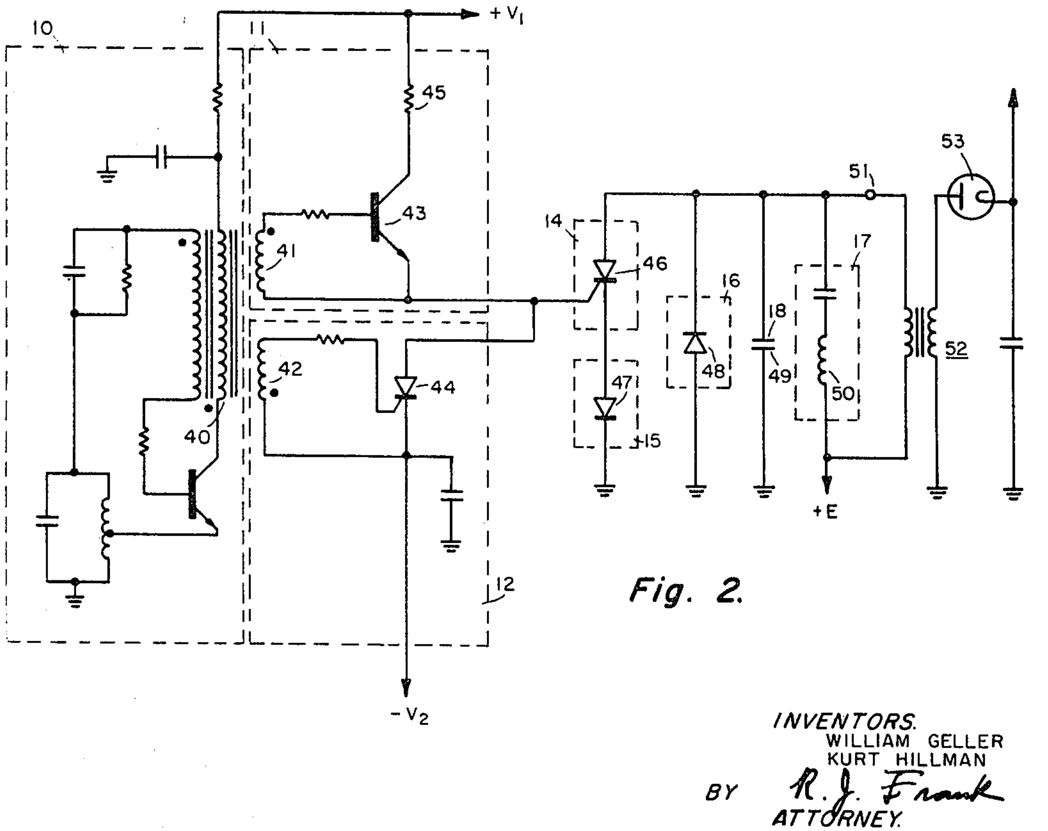
FIG. 2 is an electrical schematic diagram of one embodiment of the invention.

An electrical schematic diagram of one embodiment of the invention is shown in FIG. 2. This embodiment utilizes the frequency stable sinewave generator with pulse output described in detail in U.S. Patent No. 3,156,876 issued on Nov. 16, 1964, to M. Fischman et al. as the frequency determining circuit 10.

Turn-on and turn-off driving circuits 11 and 12 are coupled to oscillator transformer 40 by secondary windings 41 and 42. The polarity of winding 41 is opposite to that of winding 42 so that the pulses appearing thereacross differ in phase by 180 degrees. The turn-on driving circuit contains transistor 43 having its collector coupled to voltage source $+V_1$. The application of the positive portion of the output of the frequency determining circuit 10 drives transistor 43 into conduction whereupon positive current is supplied to horizontal switch 14 until the base-emitter voltage of transistor 43 is driven negative. In this embodiment, the turn-on current for switch 14 was about 100 milliamperes and a high current gain transistor Type 2N2218 was employed to minimize the loading of the oscillator.

When transistor 43 is driven off by the negative voltage appearing across winding 41, the voltage appearing across winding 42, drives the gate electrode of silicon controlled rectifier (SCR) 44 positive with respect to its cathode electrode. This renders the SCR 44 conductive whereupon the turn-off voltage $-V_2$ is coupled through a low impedance path to horizontal switch 14. The SCR is rendered conductive by a positive gate voltage and requires a relatively low drive to support anode to cathode currents of the order of several amperes. However, the SCR is rendered nonconductive by decreasing the anode current below a minimum holding valve, typically about 10 milliamperes, and not by the gate voltage. Thus, the SCR is turned off before the transistor 43 is driven once again into conduction and a significient reduction in turn-off driving power is obtained.

The use of separate turn-on and turn-off driving circuits enables the power requirements for each type of signal to be essentially independently controlled. This provides a further increase in efficiency since the turn-on signal level is not related to the requirements of the turn-off signal and no longer need be higher than actually needed. While both economies of power will be realized by using an SCR, it will be recognized that the advantage of independent power levels is also realized when a high current transistor is used in place of the SCR.

The horizontal switch 14 is required to be a high power semiconductor element which can be switched from conduction to nonconduction in periods of less than 1 microsecond. Typical peak volt-ampere reactive power requirements for horizontal deflection circuits are greater than 1500. The switch 14 of FIG. 2 is shown comprising a gate controlled switch 46 (GCS) which is similar to an SCR with the major difference being its ability to be turned off by the application of a negative voltage to its gate electrode. While not shown, a high power transistor such as Type DTS–423 may be employed in place of GCS 46. In the embodiment shown, GCS 46 and SCR 44 were Types TIC-15 and SN1935 respectively.

Prior to the time when the GCS is turned on by drive circuit 11, the voltage appearing at the anode of the GCS is approximately zero with the current through yoke coil 50 at some negative value decreasing linearly to zero. When the yoke current reaches zero, corresponding to the middle of the cathode ray tube scan, the frequency determining circuit 10 applies a positive signal to turn-on drive circuit 11 which supplies a 100 milliampere current pulse to the gate of GCS 46. The GCS is turned on and a step of voltage is applied across yoke coil 50. This results in a linear increase in yoke current and a corresponding increase in current through the GCS. The cathode of the GCS is coupled to ground through diode 47. In practice, the current flowing through the GCS increases to about 6 amperes. At the completion of the scan, the turn-on drive signal is removed and SCR 44 is rendered conductive by the signal coupled from the oscillator of circuit 10.

The SCR, when conductive, couples the negative reference voltage source $-V_2$ to the gate of GCS 46. In the embodiment shown, the reference voltage is $-32$ volts. This results in a negative gate current whose peak value is determined by the gate resistance of the GCS and reference voltage $-V_2$. The gate current is due to the removal of carriers stored in the GCS and flows for a period of about 0.1 microsecond. When the GCS is rendered nonconductive, the anode to cathode current is reduced to zero and the energy stored in yoke coil 17 is transferred to flyback capacitor 18.

Since the reference voltage $-V_2$ is relatively high, it may exceed the breakdown voltage of the gate to cathode semiconductor junction of the GCS and high reverse currents will flow through SCR 44. However diode 47 coupled to the cathode of the GCS is reverse biased by reference voltage $-V_2$ and prevents the flow of reverse breakdown current. The absence of an anode to cathode current in the SCR renders it nonconductive even though the gating signal from the oscillator is still applied to its gate electrode.

Figure 3:
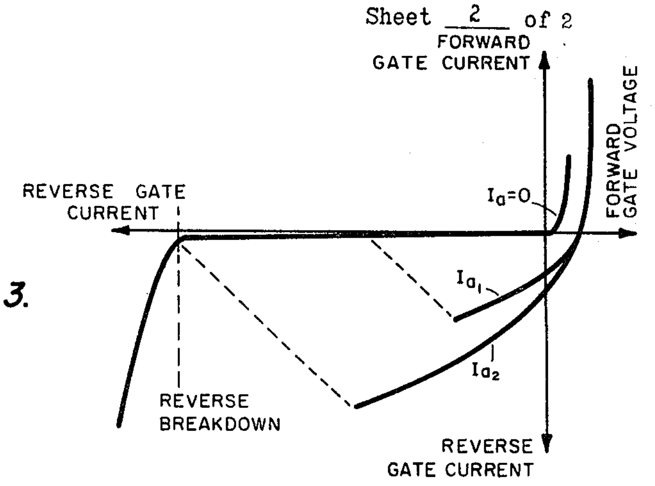
FIG. 3 shows representative I–V curves for a gate controlled switch.
Figure 4:
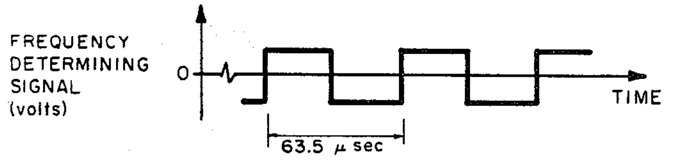
FIGS. 4 through 8 show representative waveforms for the embodiment of FIG. 2.

The I–V curves for a typical GCS are shown in FIG. 3. The static characteristic corresponding to $Ia=0$ is shown passing through the origin with reverse breakdown occurring at about $-15$ volts.

The dynamic characteristics of the GCS are shown for anode currents $Ia$ and $Ia_2$ of 2 and 4 amperes respectively. In the case of the $Ia_2$ characteristic, turn-off of the GCS reduces the reverse gate current to essentially zero. In the present circuit wherein the gate voltage is relatively high to minimize the duration of the reverse current, the voltage at the gate of the GCS is typically twice that of the reverse breakdown voltage. As mentioned, the flow of reverse current is limited by the diode 47.

Figure 5:
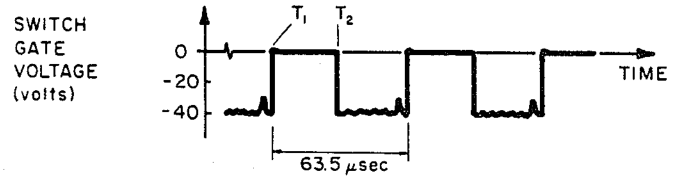
Figure 6:
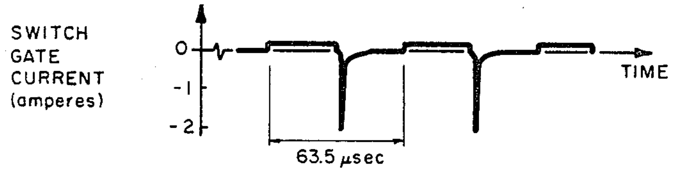

The operation of the circuit of FIG. 2 is shown by the waveforms of FIGS. 4 through 8. The frequency determining signal appearing across transformer 40 has a standard period of 63.5 microseconds and a magnitude of 30 volts. FIGS. 5 and 6 show the driving voltage and current waveforms applied by driving circuits 11 and 12 to the horizontal switch 14. When horizontal switch 14 is driven into conduction at time $T_1$ by turn-on driving circuit 11, the voltage at the gate of the switch goes positive a few volts and a positive current of about 100 milliamperes is supplied to the switch. This period of conduction finds the anode current through the switch increasing in the manner shown in FIG. 7. The period of conduction corresponds to a linear increase of yoke current as noted in FIG. 8.

Figure 7:
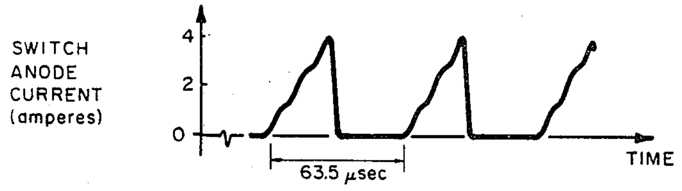
Figure 8:
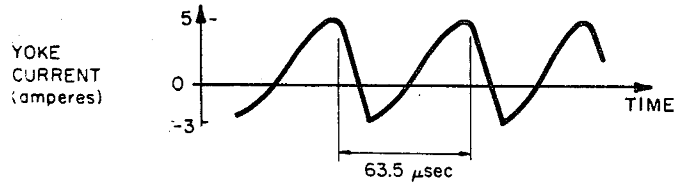

At the completion of the scan, time $T_2$, the switch driving voltage is about $-32$ volts since reference voltage $-V_2$ is applied at the gate of switch 14. A switch gate current consisting of a negative-going spike of 2 to 3 amperes renders the horizontal switch nonconductive as shown in FIG. 7 and the yoke current rapidly decreases due to the transfer of energy from the yoke to the flyback capacitor. In the embodiment shown, the time required to turn off switch 14 was approximately 0.1 microsecond.

The afore-described waveforms refer to the embodiment of FIG. 2 employing a GCS and SCR. The use of a high power transistor, such as the DTS 423, in place of the GCS has been found to provide the rapid efficient turn-off required for cathode ray tube scanning but requires a higher turn-on driving power. For example, the positive current gate shown in FIG. 6 will be of the order of 1 to 2 amperes rather than 100 milliamperes.

In addition to driving the horizontal deflection coil 17, the circuit may also be used to provide the high voltage accelerating potential for the cathode ray tube by coupling the primary winding of a conventional flyback transformer 52 to terminal 51. The high voltage induced in the secondary of transformer 52 is rectified by high voltage rectifier 53 and applied to the appropriate grid of the cathode ray tube.

While the above description has referred to a specific embodiment of the invention, it will be recognized that many modifications and variations may be made therein without departing from the spirit and scope of the invention.

What is claimed is:

1. In a circuit for generating a sawtooth signal in a horizontal deflection coil, the combination which comprises:

(a) a gate controlled switching device having first, second and third electrodes, said device passing current flowing from said first to third electrodes when rendered conductive by the application of a first polarity signal to said second electrode, said device being rendered nonconductive by the application of a second polarity signal to said second electrode, said first electrode being coupled to said deflection coil;

(b) a silicon controlled rectifier having first, second and third electrodes, said first electrode being coupled to the second electrode of said switching device, said third electrode being coupled to a voltage source having said second polarity, said silicon controlled rectifier passing current flowing from said first to third electrodes when a first polarity signal is applied to said second electrode, said current rendering said switching device nonconductive;

(c) means for coupling the third electrode of said silicon controlled rectifier to a second polarity voltage source, the voltage of said source exceeding the breakdown voltage of said gate controlled switch, said voltage being applied at the second electrode of said switch to remove stored carriers when said rectifier is rendered conductive;

(d) turn-on driving means for applying a first polarity signal to the second electrode of the gate controlled switch whereby said switch is rendered conductive;

(e) turn-off driving means for applying a first polarity signal to the second electrode of the silicon controlled rectifier at the completion of said sawtooth signal, said first polarity signal rendering said rectifier conductive whereby the second polarity voltage of said source is applied at the second electrode of said gate controlled switch; and (f) a diode having first and second electrodes and poled to pass current flowing from said first to second electrodes, said first electrode being coupled to the third electrode of the gate controlled switch, said second electrode being coupled to a reference potential, said diode limiting the flow of reverse current through said switch and thereby rendering said rectifier nonconductive when the stored carriers have been removed from the gate controlled switch.

References Cited

UNITED STATES PATENTS 3,189,783 6/1965 Van Berkum ---------- 315—27

RODNEY D. BENNETT, *Primary Examiner.*

C. L. WHITHAM, *Assistant Examiner.*